United States Patent
Matsuzawa (10) Patent No.: US 6,439,999 B1
(45) Date of Patent: Aug. 27, 2002

(54) METHOD FOR CONTROLLING EXECUTION OF PROCESSING IN VIDEO GAME, STORAGE MEDIUM STORING PROCESSING EXECUTION CONTROL PROGRAM, AND GAME APPARATUS

(75) Inventor: Takahiro Matsuzawa, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/537,984

(22) Filed: Mar. 29, 2000

(30) Foreign Application Priority Data

Aug. 4, 1999 (JP) .......................................... 11-220948

(51) Int. Cl.[7] ................................................. A63F 9/24
(52) U.S. Cl. ........................................... 463/43; 463/44
(58) Field of Search .............................. 463/30–32, 34, 463/42, 43–44

(56) References Cited

U.S. PATENT DOCUMENTS

| | | | | |
|---|---|---|---|---|
| 5,273,294 A | * | 12/1993 | Amanai | 273/435 |
| 5,903,257 A | * | 5/1999 | Nishiumi et al. | 345/157 |
| 6,080,063 A | * | 6/2000 | Khosla | 463/42 |
| 6,193,610 B1 | * | 2/2001 | Junkin | 463/40 |

FOREIGN PATENT DOCUMENTS

| | | | |
|---|---|---|---|
| JP | 06075792 A | 3/1994 | |
| JP | 08-255142 | 10/1996 | .......... G06F/15/16 |
| JP | 10289114 A | 10/1998 | |

* cited by examiner

Primary Examiner—Jessica Harrison
Assistant Examiner—Carmen D. White
(74) Attorney, Agent, or Firm—Moser, Patterson & Sheridan, L.L.P.

(57) ABSTRACT

A control method for controlling execution of processing in a video game, the game being made to progress with display of an image timed to a reference signal supplied every unit cycle. The control method comprises executing real time processing accompanied by a display routine containing a dynamic element to be completed within a time of the unit cycle with input of a reference signal; outputting a non real time processing request when a non real time processing accompanied by a thinking routine executable without being limited by the unit cycle is called by the real time processing; switching a processing object to the non real time processing after the real time processing for the unit cycle has been completed; executing the non real time processing; and when a subsequent reference signal is input after the processing object has been switched to the non real time processing, switching the processing object to the real time processing while interrupting the non real time processing; and resume in response in a subsequent unit cycle the non real time processing which has been interrupted.

11 Claims, 10 Drawing Sheets

METHOD FOR CONTROLLING EXECUTION OF PROCESSING IN VIDEO GAME, STORAGE MEDIUM STORING PROCESSING EXECUTION CONTROL PROGRAM, AND GAME APPARATUS

BACKGROUND OF THE INVENTION

1. Field of the Invention

The present invention relates to a control method for controlling execution of processing in a video game in which a game is made to progress with display of an image timed to a reference signal supplied every unit cycle, a storage medium storing a processing execution control program, and a game apparatus.

2. Related Background Art

Figure 13:
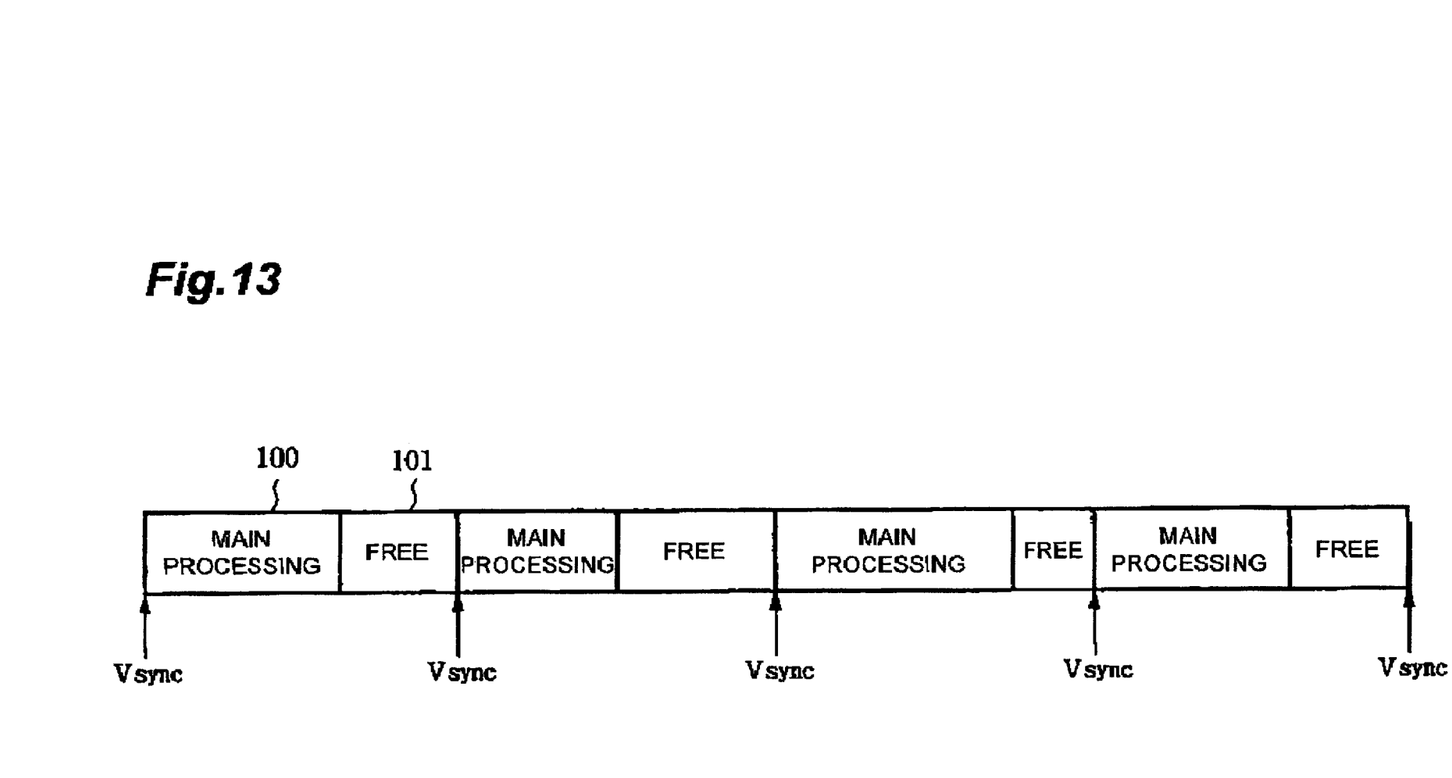
FIG. 13 is a timing chart showing a processing pattern in a conventional video game.

In the game apparatus for making a game progress with display of an image, as illustrated in FIG. 13, it is common practice to define a unit time as a duration from Vsync (vertical synchronous signal) to next Vsync and execute a predetermined process within this unit time. This unit time corresponds to a time for one frame of screen. Unless the process for one frame has been completed within the unit time, motion of characters and the other objects displayed on the screen loses smoothness and appears jerky. It is thus indispensable to note that the process for one frame is always completed within the unit time, on the occasion of programming the game. For this reason, the game is programmed so that the process for one frame (main process 100 in FIG. 13) is completed with some margin (free time 101 in FIG. 13). This allows a moving picture to be always displayed smoothly.

When the program is structured so as to complete the process for one frame with some margin in order to display the image with motion smoothly, the free time 101, however, inevitably appears between the completion of the process for one frame and next Vsync. This free time 101 is a time in which a CPU stands by without carrying out any processing, which means that the processing performance of CPU is not utilized effectively during this period.

In other words, the completion of the main process 100 with the margin allows the smooth display of the image with motion on one hand, but it does not always assure the effective utilization of processing performance of CPU because of the free time 101 appearing inevitably, on the other hand.

SUMMARY OF THE INVENTION

An object of the present invention is to provide a control method for controlling execution of processing in a video game, a storage medium storing a processing execution control program, and a game apparatus. The control method of the invention assures the effective utilization of processing performance of CPU while allowing the smooth display of image with motion.

One aspect of the invention provides a method for controlling execution of processing in a video game, the game being made to progress with display of an image timed to a reference signal supplied every unit cycle, the method comprising, executing real time processing accompanied by a display routine containing a dynamic element to be completed within a time of the unit cycle with input of a reference signal, outputting a non real time processing request when a non real time processing accompanied by a thinking routine executable without being limited by the unit cycle is called by said real time processing, switching a processing object to said non real time processing after said real time processing for the unit cycle has been completed, executing said non real time processing; when a subsequent reference signal is input after the processing object has been switched to said non real time processing, switching the processing object to said real time processing while interrupting said non real time processing, and resume in response in a subsequent unit cycle said non real time processing which has been interrupted.

As a consequence, the real time processing is carried out with input of the reference signal supplied every unit cycle, and the non real time processing request is outputted when the need for the non real time processing arises during the real time processing. After completion of the real time processing, the non real time processing is then started to carry out the processing according to the non real time processing request outputted in the real time processing execution step. When the reference signal is supplied during the non real time processing, the real time processing is started again.

Therefore, the real time processing has been completed in the time of the unit cycle with reliability, and the non real time processing is carried out during the free time. Since the real time processing is the processing accompanied by the display routine containing the dynamic element, certain smoothness of motion of the displayed image is assured, because the processing accompanied by the display routine is carried out with reliability. The execution of the non real time processing in the free time assures the effective utilization of the processing performance of CPU.

In addition, since the non real time processing is the processing accompanied by the thinking routine, the certain smoothness of motion of the displayed image is assured, while a sufficient time is guaranteed for the processing concerning thinking in a simulation game.

In the above invention, the method may comprise queuing said non real time processing request in order in a queue buffer, and executing said non real time process in order in said queue buffer.

Further in the above invention, the method may comprise queuing a new non real time processing request in the queue buffer when said non real time processing calls a new non real time process.

Therefore, the processes according to the non real time processing requests, queued not only in the real time processing execution step but also in the non real time processing execution step, are carried out as the non real time processing during the free times as described above, whereby the processing performance of CPU is utilized more effectively.

Further it is one aspect of the present invention to provide a computer-readable storage medium storing a processing execution control program by which a game is made to progress with display of an image timed to a reference signal supplied every unit cycle, said processing execution control program causing a computer to execute a process comprising, executing real time processing accompanied by a display routine containing a dynamic element to be completed within a time of the unit cycle with input of a reference signal, outputting a non real time processing request when a non real time processing accompanied by a thinking routine executable without being limited by the unit cycle is called by said real time processing, switching a processing object to said non real time processing after said real time processing for the unit cycle has been completed, executing said non real time processing, when a subsequent reference signal is input after the processing object has been switched to said non real time processing, switching the processing object to said real time processing while interrupting said non real time processing, and resume in response in a subsequent unit cycle said non real time processing which has been interrupted.

According to the invention a game apparatus may be implemented by making a computer read in the program stored in the storage medium. Therefore, such storage media allow the program to be distributed and sold readily as software products independent of the apparatus. When this software is used by use of such hardware as general purpose computers or general purpose game apparatus, the game technology of the present invention can be carried out readily by these hardware.

It is more further aspect of the present invention to provide a game apparatus for making a game progress with display of an image timed to a reference signal supplied every unit cycle, said game apparatus comprising, a real time processing execution unit for executing real time processing accompanied by a display routine containing a dynamic element to be completed within a time of said unit cycle with input of said reference signal, and outputting a non real time processing request when a non real time processing accompanied by a sub routine executable without being limited by said unit cycle, is called by said real time processing, a non real time processing execution unit for executing said non real time processing and assuring that the processing is completed even with interruption, and a processing switch controller for starting the non real time processing execution unit after said real time processing execution unit has been completed, and for starting said real time processing execution unit while interrupting said non real time processing execution unit, with input of said reference signal.

It is still further aspect of the present invention to provide a computer data signal embodied in a transmission medium, said computer data signal containing a processing execution control program by which a game is made to progress with display of an image timed to reference signal supplied ever unit cycle, wherein said program causes a computer to perform a process comprising, executing real time processing accompanied by a display-routine containing a dynamic element to be completed within a time of the unit cycle with input of a reference signal, outputting a non real time processing request when a non real time processing accompanied by a thinking routine executable without being limited by the unit cycle is called by said real time processing, switching a processing object to said non real time processing after said real time processing for the unit cycle has been completed, executing said non real time processing; when a subsequent reference signal is input after the processing object has been switched to said non real time processing, switching the processing object to said real time processing while interrupting said non real time processing, and resume in response in a subsequent unit cycle said non real time processing which has been interrupted.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS OF THE PRESENT INVENTION

Embodiments of the present invention will be described below in accordance with the drawings. In the following description, an application of the present invention to a game machine for home use will be described as an example.

Figure 1:
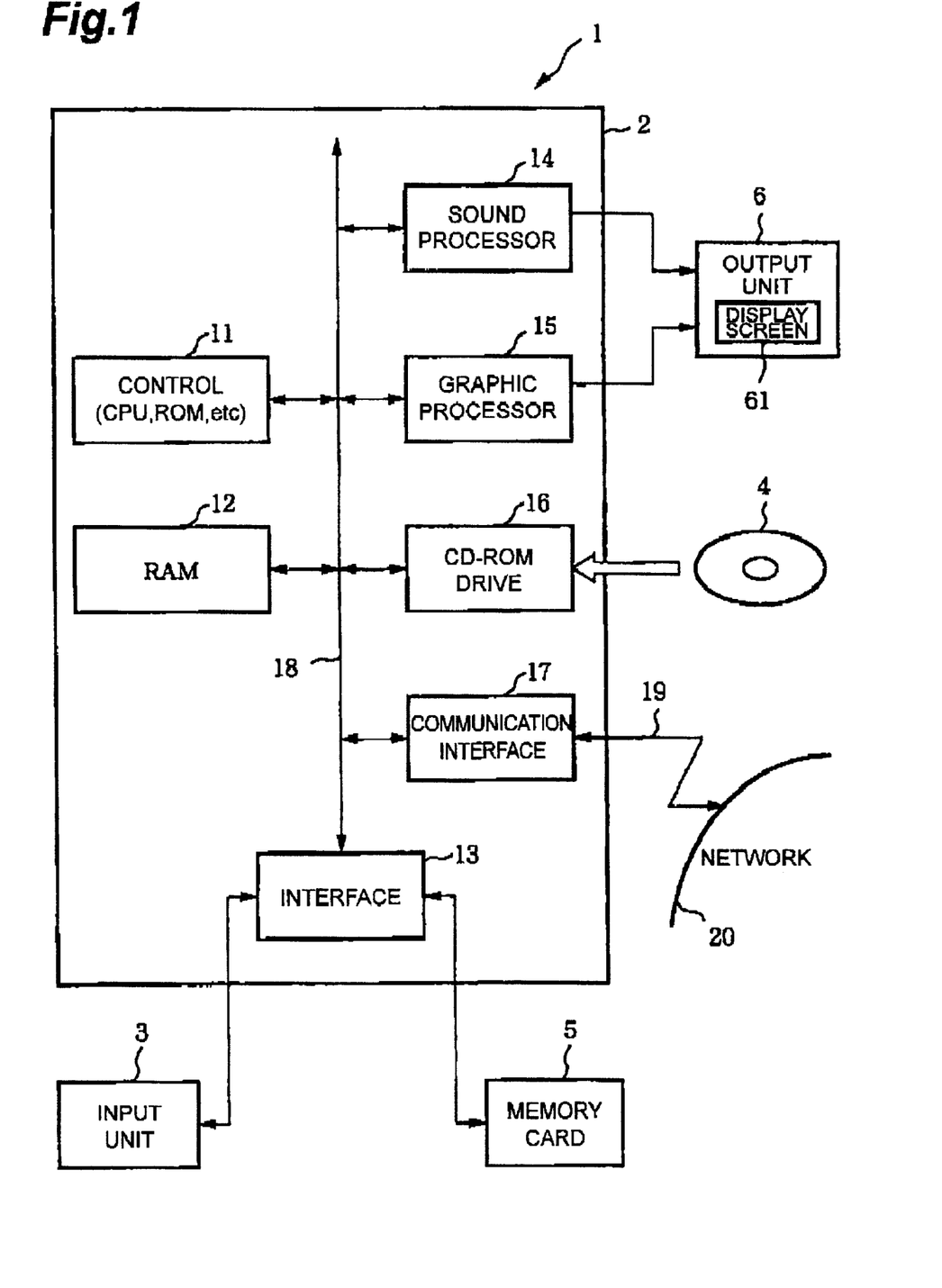
FIG. 1 is a hardware block diagram showing the overall structure of the game apparatus of one embodiment of the present invention.

FIG. 1 is a block diagram showing the structure of the game apparatus according to one embodiment of the invention. As illustrated, this game apparatus 1 includes, for example, a main body of game machine 2, an input device 3, a memory card 5, a CD-ROM 4, and an output device 6.

The main body 2 is composed, for example, of a control section 11, a RAM (Random Access Memory) 12, an interface section 13, a sound processing section 14, a graphic processing section 15, a CD-ROM (Compact Disc Read Only Memory) drive 16, a detachable CD-ROM 4, and a communication interface 17, which are connected to each other via a bus 18.

The control section 11 includes a CPU (Central Processing Unit), a ROM (Read Only Memory) storing basic programs including a boot program, an OS (Operating System), and so on. and sequentially executes programs stored in the RAM 12 to perform processing for advancing the game. The control section 11 also controls action of each section 12 to 17 in the main body 2.

The RAM 12 is used as a main memory of the main body 2 and stores programs and data necessary for progress of the game, transferred from the CD-ROM 4. The RAM 12 is also used as a work area during execution of the programs. Areas allocated in the RAM 12 and data stored in the respective areas will be detailed hereinafter.

Connected to the interface section 13 are the input device 3 and the memory card 5 which are detachable. The interface section 13 controls exchange of data between the input device 3/the memory card 5 and the control section 11/the RAM 12. The input device 3 is equipped with direction keys and various buttons. By manipulating these keys and buttons, the player provides input signal for progress of the game, including instructions for movement and instructions for action to a player character. The memory card 5 is a memory for saving data indicating the status of progress of the game.

The sound processing section 14 carries out a process for reproducing sound data such as BGM (Back Ground Music), sound effect, and the like according to the progress status of the game in response to a command from the control section 11 and outputs a voice signal to the output device 6.

The graphic processing section 15, which includes a circuit for generating a vertical synchronous signal (Vsync), outputs the vertical synchronous signal to the control section 11 and performs three-dimensional graphic processing in response to a command from the control section 11 to generate image data according to the progress status of the game. The graphic processing section 15 adds the vertical synchronous signal to the image data generated and outputs the resultant video signal to the output device 6.

The CD-ROM drive 16 drives the CD-ROM 4 set in the main body 2 in response to a command from the control section 11 and transfers the programs and data stored in the CD-ROM 4 via the bus 18 to the RAM 12.

The communication interface 17 is connected via a communication line 19 to an external network 20 and performs processing for exchange of a program or data with the external network 20 in response to a command from the control section 11.

The CD-ROM 4 stores the programs and data necessary for the progress of the game. The CD-ROM 4 is driven by the CD-ROM drive 16 and the programs and data stored therein are read out thereof. The programs and data read from the CD-ROM 4 are transferred from the CD-ROM drive 16 via the bus 18 to the RAM 12.

The output device 6 is provided with a display screen 61 comprised of a CRT (Cathode Ray Tube) or the like for displaying an image corresponding to the video signal from the graphic processing section 15. The output device 6 may also include loudspeakers (not illustrated) for outputting sound corresponding to the sound signal from the sound processing section 14. A television receiver is normally used as the output device 6.

Next, the areas allocated in the RAM 12 of FIG. 1 and the data stored in the respective areas will be described in detail.

Figure 2:
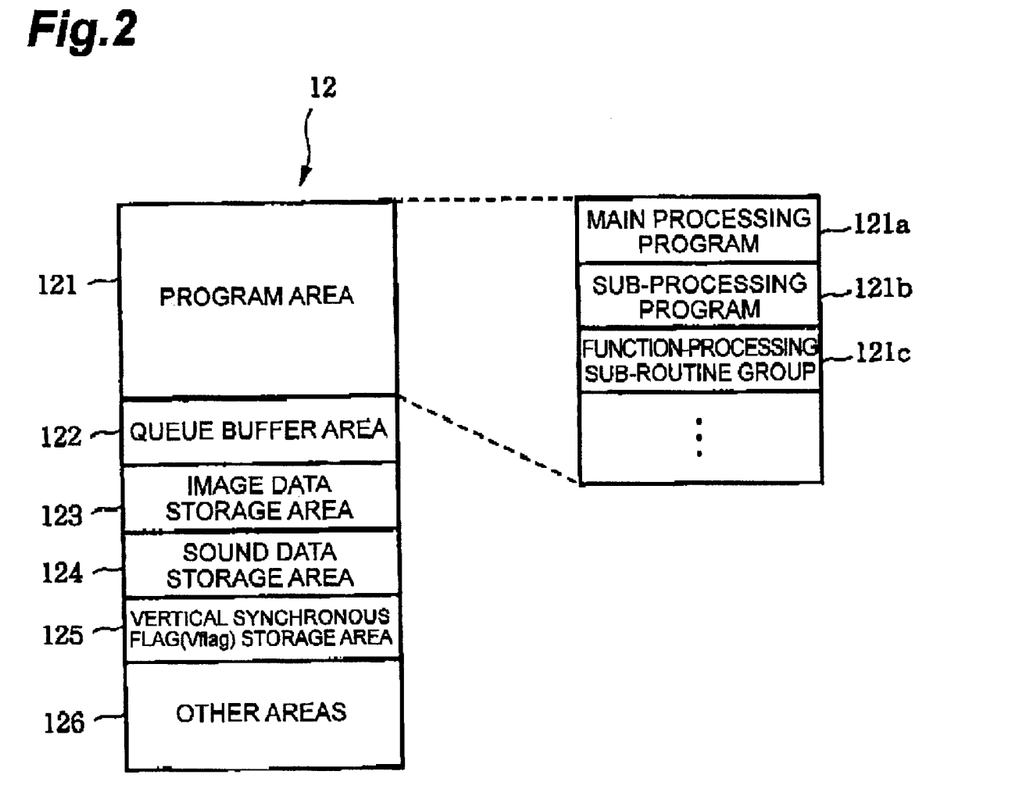
FIG. 2 is a memory map showing the areas allocated in the RAM of FIG. 1.

FIG. 2 is a diagram showing the areas allocated in the RAM 12 according to the invention. As illustrated, allocated in the RAM 12 are a program area 121, a queue buffer area 122, an image data storage area 123, a sound data storage area 124, a vertical synchronous flag (Vflag) storage area 125, and other areas 126. Programs and data stored in these areas 121 to 126 are those read from the CD-ROM 4 by the CD-ROM drive 16 under control of the control section 11 and transferred to the RAM 12.

The program area 121 stores programs necessary for execution of the game, including a main processing program 121a, a sub-processing program 121b, a sub-routine group for function processing 121c, and so on, which will be presented in flowcharts described below. The main processing program 121a is a program for executing the real time processing accompanied by the display routine containing the dynamic element to be completed in the unit cycle from the aforementioned vertical synchronous signal (Vsync) to the next vertical synchronous signal (Vsync). The sub-processing program 121b is a program for executing the non real time processing accompanied by the thinking routine executable without being limited by the unit cycle, and the sub-routine group for function processing 121c is a sub-routine group for processing a function by this non real time processing.

Figure 3:
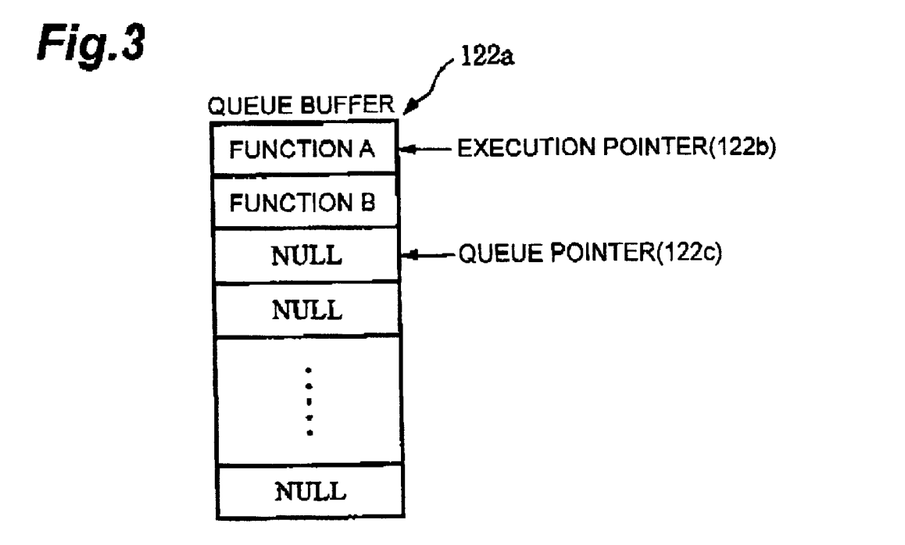
FIG. 3 is a conceptual diagram showing the details of the queue buffer in the queue buffer area of FIG. 2.

Formed in the queue buffer area 122 is a queue buffer 122a comprised of a ring buffer having a plurality of areas, as illustrated in FIG. 3. Functions to be processed in non real time are queued in the queue buffer 122a. Data called NULL is set in each of areas without queuing of any function. Further formed in this queue buffer area 122 are an execution pointer 122b which sequentially points out the areas storing respective functions to be processed on the sub-processing side (thread B in FIG. 6) described hereinafter and a queue pointer 122c which sequentially points out the areas in which respective subsequent functions are to be saved. The execution pointer 122b and the queue pointer 122c are stored in a given space in the queue buffer area 122.

Vflag is set in the vertical synchronous flag (Vflag) storage area 125 and this Vflag is a flag set with occurrence of the vertical synchronous signal (Vsync) and reset at a start of the main (thread A in FIG. 4) processing described hereinafter.

In the present embodiment according to the above structure, once the game is started, the control section 11 will reserve areas for storing information in the RAM 12, thereby reserving the program area 121, the queue buffer area 122, the image data storage area 123, the sound data storage area 124, and the other areas 126 etc. in the RAM 12, as illustrated in FIG. 2. Receiving a game start request such as manipulation of the input device 3 by a player, the control section 11 reads the information necessary for the game to be started from the CD-ROM 4 into the RAM 12 and then makes an image displayed on the display screen 61, based on the game program thus read. The player advances the game while manipulating the keys and buttons of the input device 3 on the basis of the image on the display screen 61.

Figure 4:
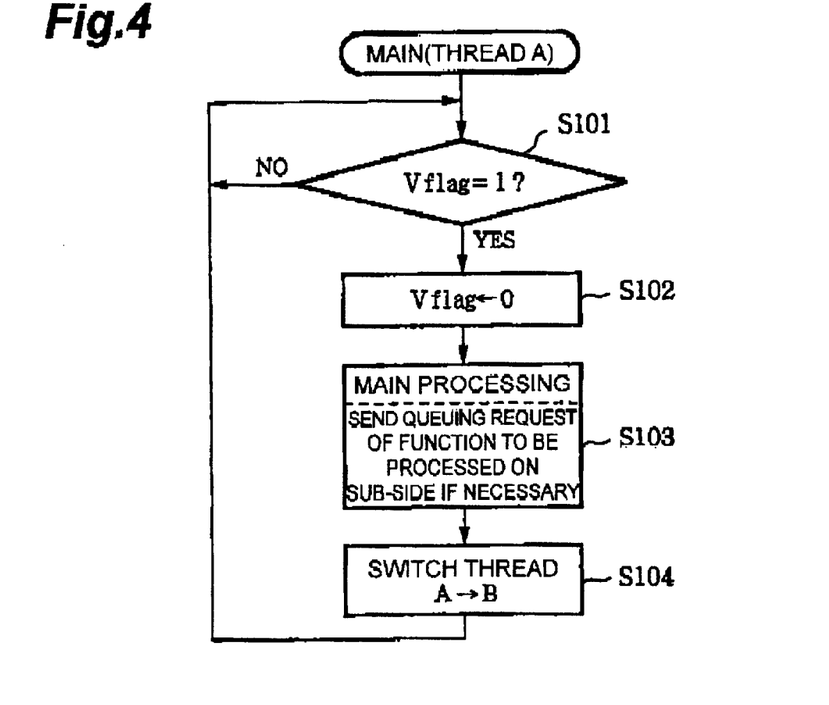
FIG. 4 is a flowchart showing the processing procedures in the main (thread A) processing.

During game play, the main (thread A) processing is carried out according to the flowchart illustrated in FIG. 4, and the control section waits for setting of Vflag (step S101). When Vflag is set in synchronism with Vsync by a Vsync interrupt processing (FIG. 7) described hereinafter, the Vflag is reset (step S102). Thereafter, the control section executes the main processing accompanied by the display routine containing the dynamic element of the image displayed on the display screen 61 in accordance with the main processing program 121a and, if necessary (i.e. if the main program calls a sub-routine to be executed in non real time), outputs a queue request of a function to be processed on the sub-processing side (step S103). The function to be processed on the sub-processing side herein means a handling request of a processing routine executable without being limited by cycles of occurrence of Vsync. Namely, for example, if there is a process to be handled on the sub-processing side, such as thinking of an enemy strategy or the like, the control section will request queuing of a function corresponding to the process of interest. After the main processing to be carried out in one frame has been completed, the control section switches the main processing in thread A to the sub-side processing in thread B (step S104) and then returns to step S101. The switching to the thread B causes the non real time processing to be defined as a processing object.

Figure 5:
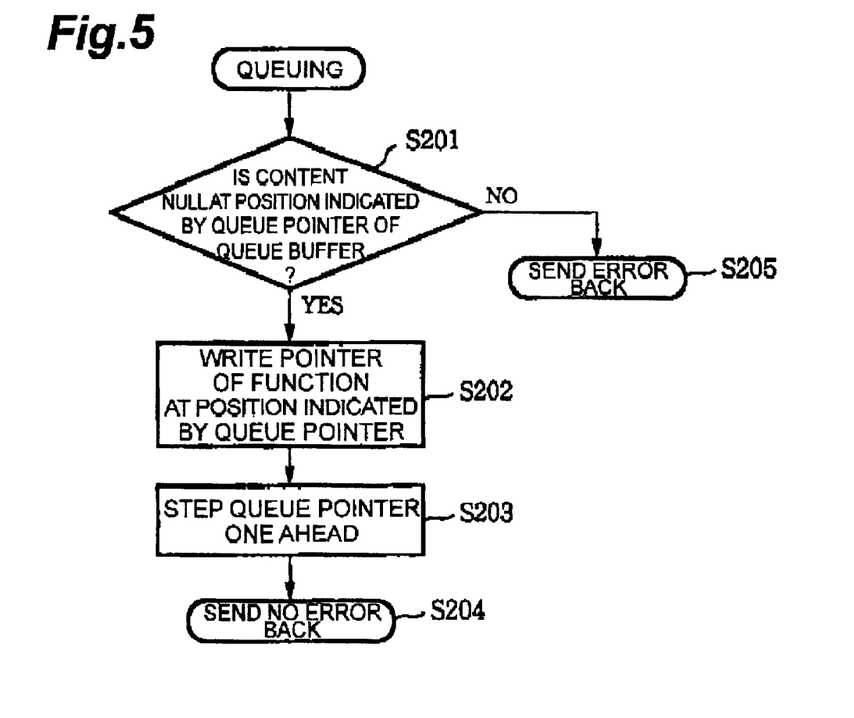
FIG. 5 is a flowchart showing the processing procedures on the occasion of queuing a function in the queue buffer.

With the queuing request of the function in aforementioned step S103, the control section 11 starts the queuing processing according to the flowchart illustrated in FIG. 5 and first determines whether the content of the area indicated by the queue pointer 122c in the queue buffer 122a is NULL (step S201). If the area stores a function without NULL, ERROR is sent back (step S205). When the area stores NULL, i.e., when the area indicated by the queue pointer 122c is vacant, the control section writes a pointer of the function (the function requested to queue in aforementioned step S103) at the position (area) indicated by the queue pointer 122c (step S202). Further, the control section steps the queue pointer 122c one ahead (step S203) and then NOERROR is sent back (step S204).

The queue buffer 122a includes a sufficient number of areas to assure that the content of the area indicated by the queue pointer 122c is always NULL. Therefore, as long as the queue buffer 122a is normal, ERROR will never be sent back in the process of step S205 and the processing in steps S201 to S204 will be carried out to effect writing of the function.

Figure 6:
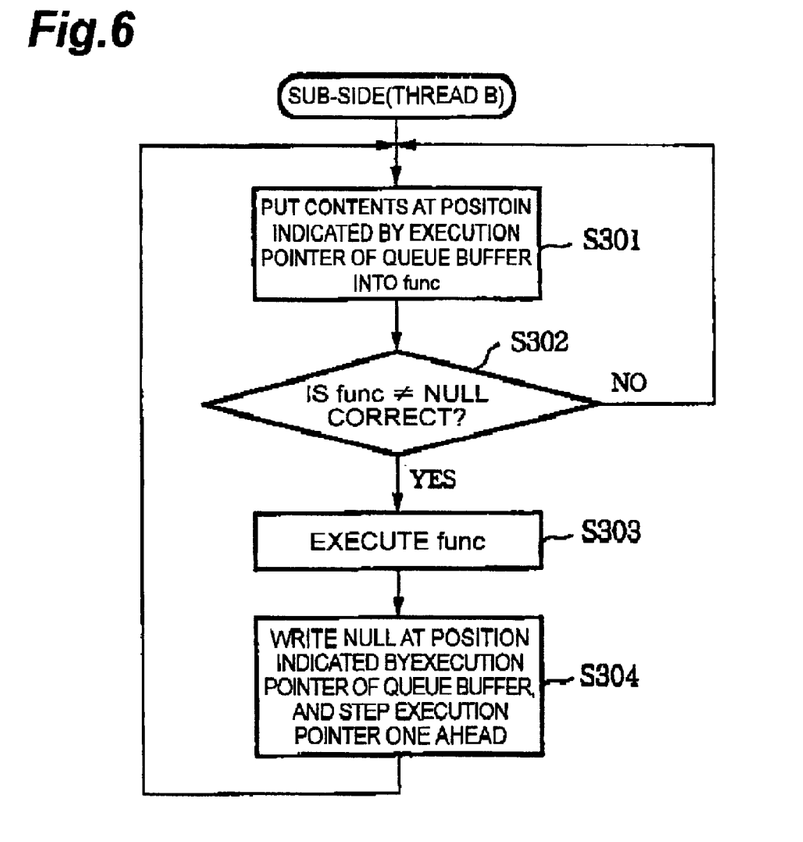
FIG. 6 is a flowchart showing the processing procedures in the sub-side (thread B) processing.

Referring back to step S104 of FIG. 4, after switching from the thread A to B, the control section 11 carries out the sub-side (thread B) processing according to the flowchart illustrated in FIG. 6. That is, the contents (i.e. Function) at the position indicated by the execution pointer 122b of the queue buffer 122a are substituted into variable func (step S301) which stores a function to be executed. Then the control section determines whether the contents put into the variable func is NULL (step S302). If the content is not NULL (i.e. func≠NULL) and a function is stored, the control section reads, with the function as a pointer, a corresponding sub-routine from the function-processing sub-routine group 121c and executes the process (step S303).

Figure 7:
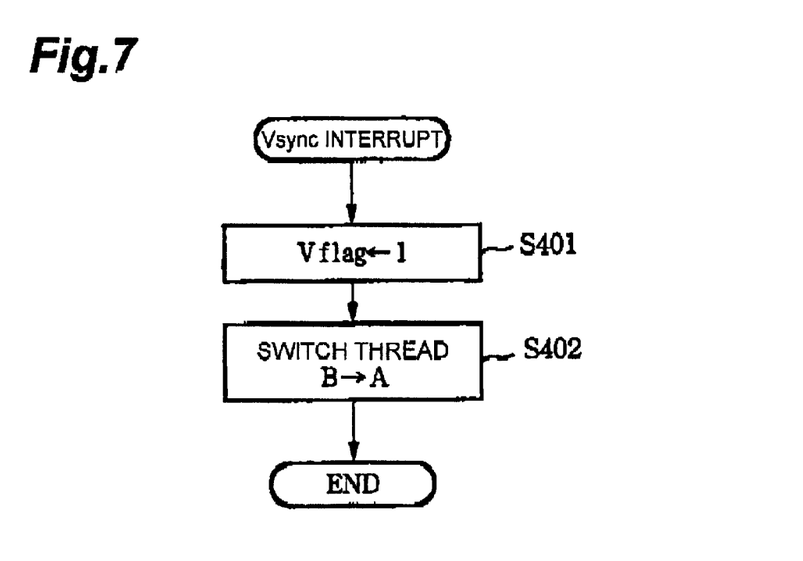
FIG. 7 is a flowchart showing the processing procedures in the Vsync interrupt processing.

If during the processing according to the the sub-routine the processing is interrupted because of switching from the thread B to A in step S402 of FIG. 7 described below, the subsequent processing will be carried out at the next time of execution of step S303, i.e., on the next processing occasion. This thus assures that the processing according to the aforementioned sub-routine is completed even with interruption.

After executing the function, the control section writes NULL at the position indicated by the execution pointer 122b of the queue buffer 122a and steps the execution pointer 122b one forward (step S304), and thereafter the control section repeats the processing from step S301 for the next position in the queue buffer. The control section 11 repeatedly carries out the processing according to this flowchart during the switched period to the sub-side (thread B) processing until the contents at the position indicated by the execution pointer 122b becomes NULL. Thus, the functions in the queue buffer are sequentially processed in the queuing order in the queue buffer 122a, so that only one thread suffices for carrying out the sub-side processing even if a plurality of functions are queued in the queue buffer 122a, so as to involve a plurality of processes to be executed in the sub-side processing.

Figure 8:
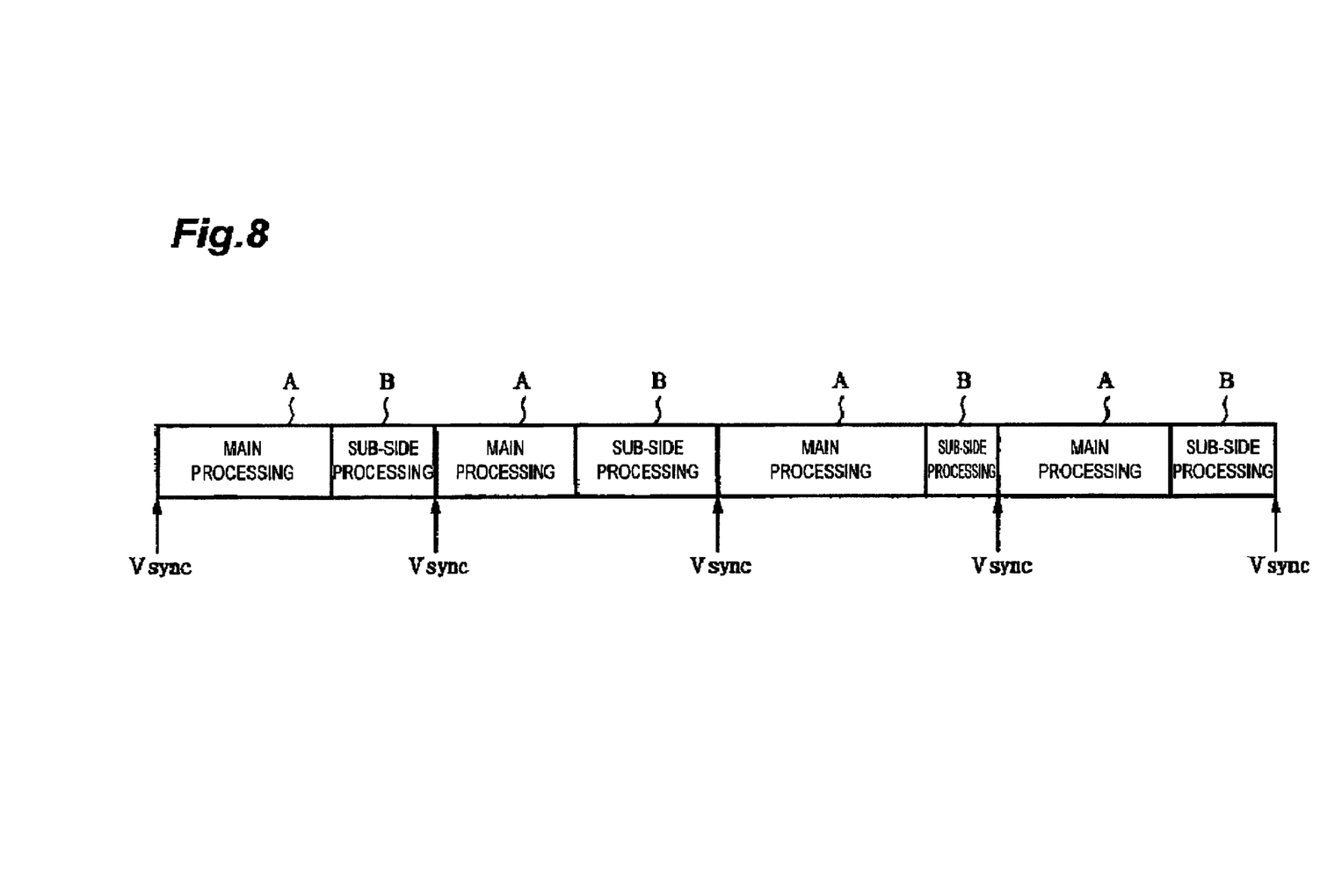
FIG. 8 is a timing chart showing a processing pattern in one embodiment of the present invention.

Vsync is generated from the graphic processing section 15 typically in cycles of 1/60 sec and entered into the control section 11. With each Vsync, the control section 11 carries out the Vsync interrupt processing shown in the flowchart of FIG. 7. When a Vsync is entered into control section 11, the Vflag is set to 1 (step S401), and the processing is switched from the thread B to the thread A (step S402). The main program of real time processing is defined as the processing object. At the same time, the control section 11 suspends the sub-side (thread B) processing illustrated in FIG. 6 and then resumes the main (thread A) processing illustrated in FIG. 4. Referring to FIG. 8, the sub-side processing B11–B14 is carried out without appearance of the free time 101 (see FIG. 13), while the main processing A11–A14 is carried out with a margin within the unit time from Vsync to next Vsync, as illustrated in FIG. 8. As a consequence, a smooth motion of the image displayed on the display screen 61 by the main processing A11–A14 is provided, while the effective utilization of the processing performance of CPU is also assured by processing the sub-side processing B11–B14 during the free time between Vsync.

Figure 9:
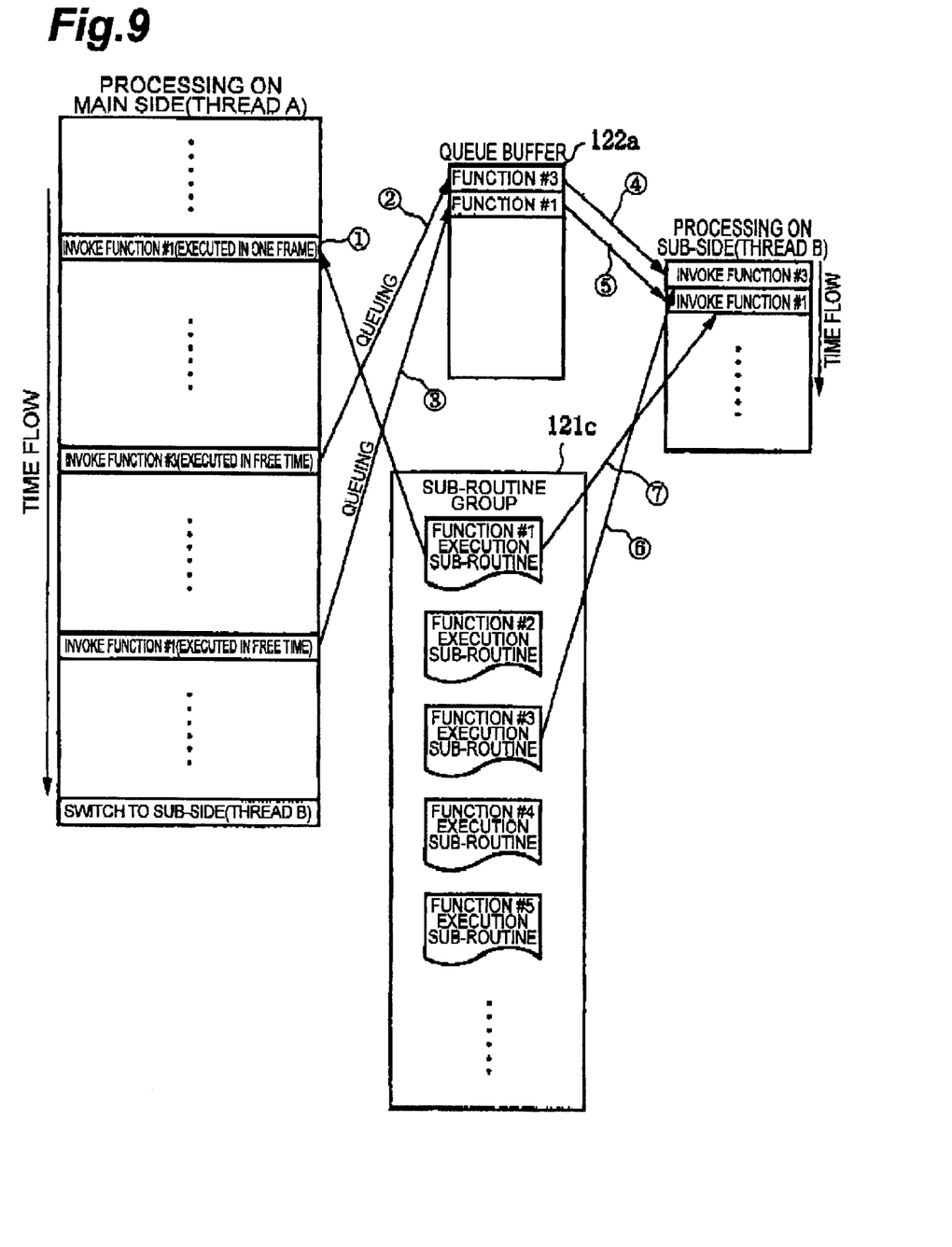
FIG. 9 is an image diagram showing a processing pattern of the processing according to the flowcharts of FIGS. 4 to 7.

The processing according to the flowcharts of FIGS. 4 to 7 above allows the following operation as illustrated in the image diagram of FIG. 9. On the main processing side (thread A), as to the process of function #1 to be executed in one frame, a sub-routine for the function #1 can be invoked from the sub-routine group 121c and be executed (①). As for the process of function #3 which may be executed in the free time, the function #3 is queued into the queue buffer 122a (②) and further, as to the process of function #1 which is defined as a job executable in the free time at this point, the function #1 is queued into the queue buffer 122a (③). In the processing on the sub-side (thread B), the contents stored in the queue buffer 122a are referenced sequentially (④ ⑤), the corresponding sub-routines of the functions #3 and #1 are invoked from the sub-routine group (⑥ ⑦), and then they are executed.

Figure 10:
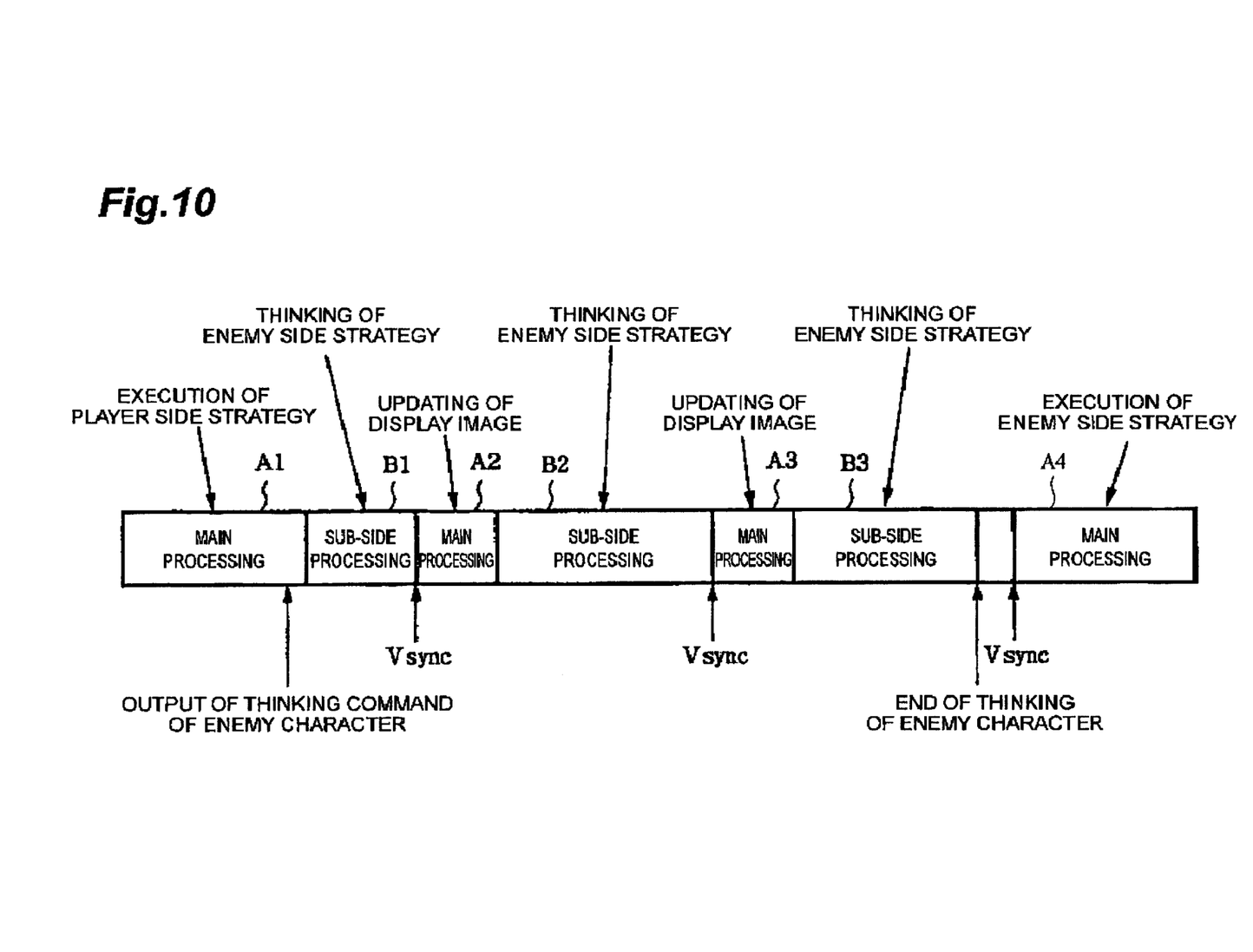
FIG. 10 is a timing chart showing an example of a processing pattern wherein the processing according to the flowcharts of FIGS. 4 to 7 is applied to a simulation game.

The processing pattern as illustrated in FIG. 10 can be implemented by executing the processes according to the flowcharts of FIGS. 4 to 7 in the simulation game. Namely, a player-side strategy is made in the main processing A1 and thereafter if there is a thinking command of an enemy character then thinking of an enemy-side strategy is executed in the sub-side processing B1 subsequent to the main processing A1. With a start of this thinking of the enemy strategy, a minimum process to update the image is carried out in next main processing A2, whereby more time is assigned to the sub-side processing B2 to execute the thinking of the enemy strategy. Further, the minimum process to update the image is also carried out in the next main processing A3, whereby more time is assigned to the sub-side processing B3 to execute the thinking of the enemy strategy. In FIG. 10, sub-side processing 133 is completed before the next Vsync, and free time is available to execute another sub-routine.

Figure 11A:
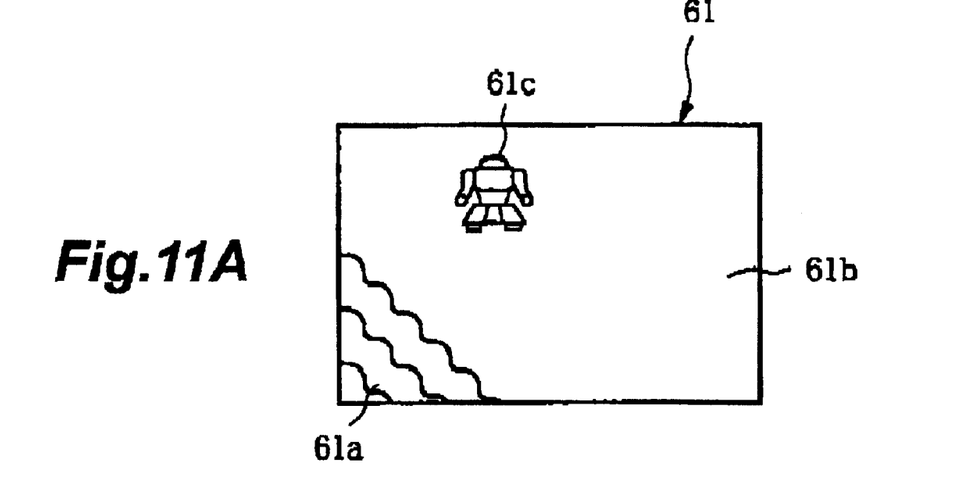
FIGS. 11A–11C respectively show display screens in the present embodiment.
Figure 11B:
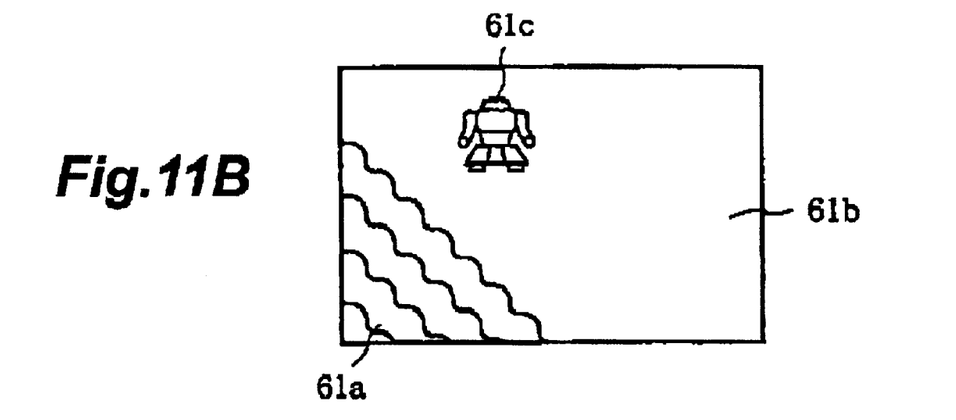
Figure 11C:
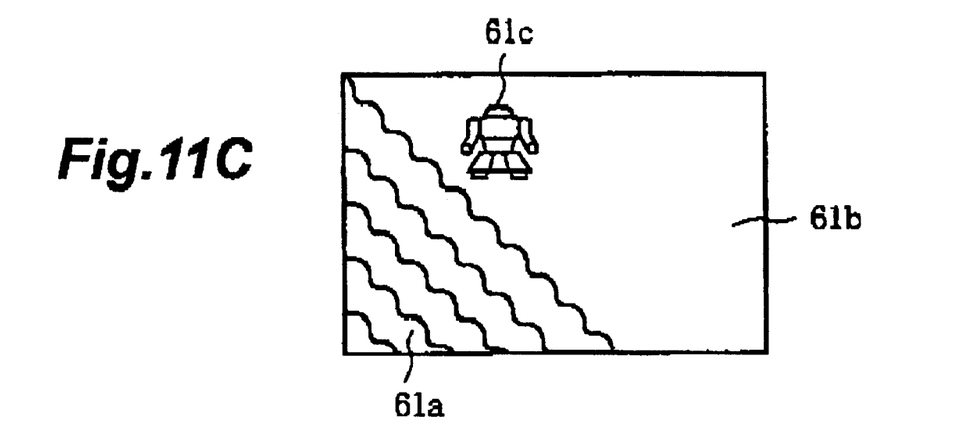

In the above processing pattern, for example, supposing an image of waves 61a rolling across sandy beach 61b with an enemy character 61c thereon is displayed on the display screen 61 as illustrated in FIG. 11A, the main processing A2 is to update the display image as illustrated in FIG. 11B and the main processing A3 is to update the image as illustrated in FIG. 11C. This varies the images in the display states of the waves 61a varying in the sequence of (a)→(b)→(c) while the control section 11 is in thinking of the enemy-side strategy, which can prevent the player from feeling bored.

Figure 12:
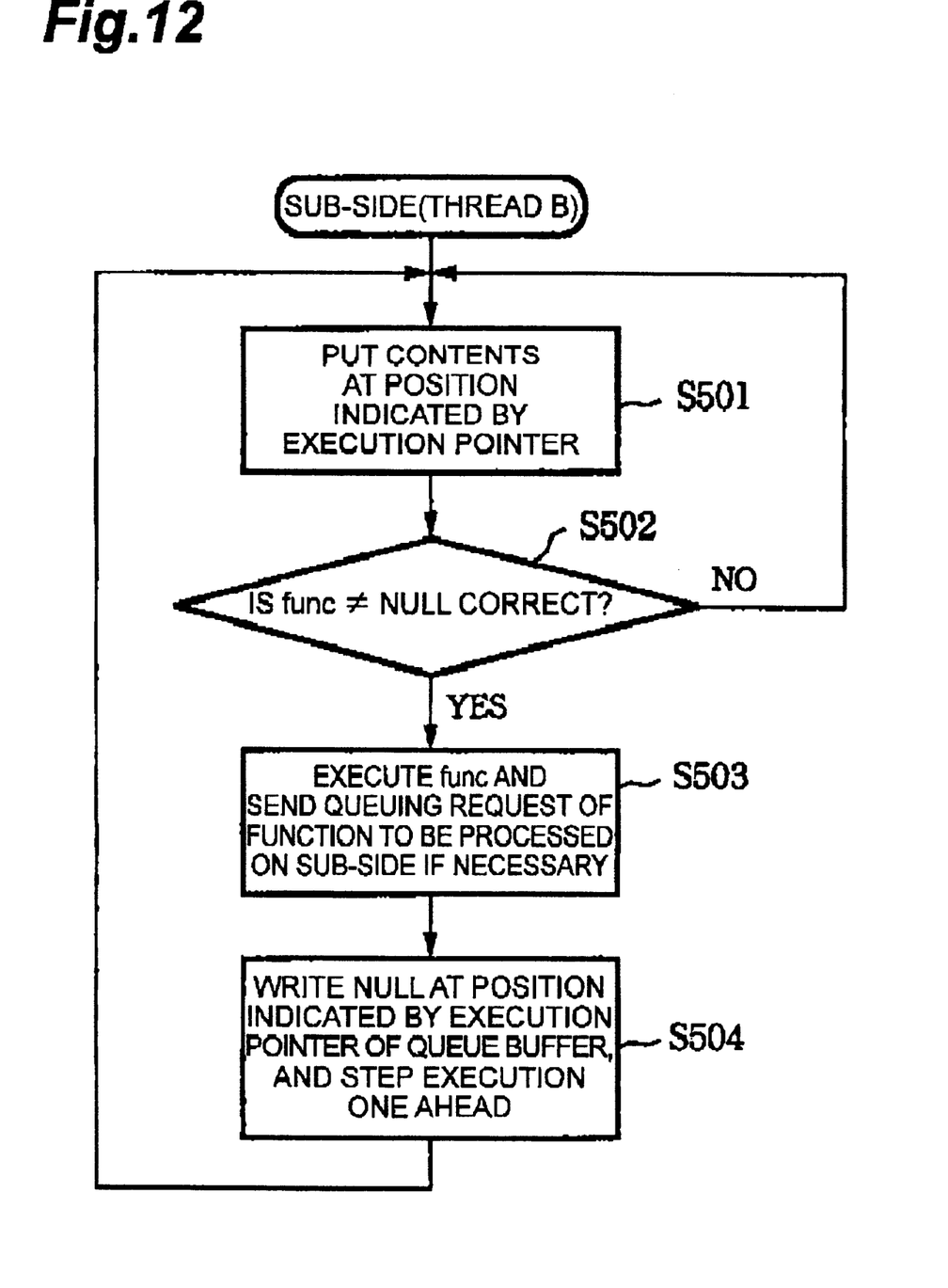
FIG. 12 is a flowchart showing the processing procedures in the sub-side (thread B) processing in another embodiment of the present invention.

FIG. 12 is a flowchart showing the sub-side (thread B) processing in another embodiment of the present invention. In this embodiment, similar to the aforementioned embodiment, the main processing, including switching of the thread from A to B, etc., are carried out according to the aforementioned main-side (thread A) processing flow of FIG. 4. The queuing of function and the forwarding of the queue pointer are carried out according to the aforementioned queuing flow of FIG. 5. The switching of the thread from B to A is carried out according to the aforementioned Vsync interrupt flow of FIG. 7. As for the sub-side (thread B) processing, the processing is carried out according to the flowchart of FIG. 12. As shown in this flowchart, steps S501, S502, S504 are processes similar to steps S301, S302, S304 in FIG. 6 of the aforementioned embodiment. Namely, the control section substitutes the contents at the position indicated by the execution pointer 122b of the queue buffer 122a into the variable func (step S501) and then determines whether the contents put into this variable func are NULL (step S502).

If the content is not NULL (i.e. func≠NULL) and is a function, the control section reads a corresponding sub-routine from the function-processing sub-routine group 121c with the function as a pointer and executes the process (i.e., the function being executed calls another sub-routine. If necessary, the control section outputs a request of queuing the function corresponding to the sub-routine to be processed in the sub-side processing. After step 503, the control section writes NULL at the position indicated by the execution pointer 122b of the queue buffer 122a and steps the execution pointer 122b one forward (step S504).

Receiving the queuing request of the function to be processed on the sub-side in the process at step S503, the control section queues the function in the queue buffer 122a by the process according to the flowchart illustrated in aforementioned FIG. 5. When the next sub-side processing is carried out to execute step S503, the process corresponding to the function under the preceding queue request can be carried out in the sub-side processing, whereby the CPU can be utilized more effectively.

Although the present embodiment was described as an example of the present invention realized using the game machine for home use as a platform, the present invention may also be substantiated using the general purpose computer, such as the personal computer or the like, or the arcade game machine as a platform.

In the present embodiment the programs and data for realizing the present invention were stored in the CD-ROM and this CD-ROM was used as a storage medium. However, the storage medium is not limited to the CD-ROM, but may also be a DVD (Digital Versatile Disc) or any other magnetic or optical storage medium or semiconductor memory which can be read by the computer. Further, the programs and data for implementing the present invention may also be provided in the form wherein they are preinstalled in the game machine or in the storage device of computer.

The programs and data for realizing the present invention may also be provided in the form of use wherein they are downloaded via the communication interface 17 illustrated in FIG. 1, from another device on the network 20 connected through the communication line 19. The programs and data may also be provided in the form of use wherein they are recorded in a memory of another device on the communication line 19 and they are successively taken via the communication line 19 into the RAM 12 as occasion arises.

The programs and data for realizing the present invention may also be provided in the form of a computer data signal in which they are superimposed on a carrier wave, from another device on the network 20. In this case, transmission of the computer data signal is requested from the communication interface 17 via the communication line 19 to another device on the network 20 and the computer data signal transmitted is received and stored in the RAM 12. The present invention can also be realized in the game apparatus 1 by using the programs and data stored the RAM 12 in this way.

The present invention is substantiated as follows: the non real time processing request is outputted with the need for the non real time processing accompanied by the thinking routine executable without being limited by the unit cycle during the real time processing accompanied by the display routine containing the dynamic element to be completed within the time of the unit cycle, and after completion of the real time processing the processing is switched to the non real time processing to execute the processing according to the non real time processing request. Therefore, the time after the real time processing in the time of the unit cycle can be utilized effectively for the non real time processing. The invention allows the processing performance of the CPU to be utilized effectively by the execution of the non real time processing, while allowing the smooth display of images with motion by the real time processing. Further, the visual sensation of the player can be stimulated by forming the moving picture state with reliability even during the thinking period of the enemy strategy according to the thinking routine, which can enhance interestingness of the simulation game. The computer data signal may be compressed and/or encrypted.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for controlling execution of processing in a video game, the game being made to progress with display of an image timed to a reference comprising:
   executing real time processing accompanied by a display routine containing a dynamic element to be completed within a time of the unit cycle with input of a reference signal;
   outputting a non real time processing request when a non real time processing accompanied by a thinking routine executable without being limited by the unit cycle is called by said real time processing;
   switching a processing object to said non real time processing after said real time processing for the unit cycle has been completed;
   executing said non real time processing;
   when a subsequent reference signal is input after the processing object has been switched to said non real time processing, switching the processing object to said real time processing while interrupting said non real time processing; and
   resume in response in a subsequent unit cycle said non real time processing which has been interrupted.

2. The method according to claim 1, further comprising:
   queuing said non real time processing request in order in a queue buffer; and
   executing said non real time process in order in said queue buffer.

3. The control method according to claim 2, further comprising:
   queuing a new non real time processing request in the queue buffer when said non real time processing calls a new non real time process.

4. A computer-readable storage medium storing a processing execution control program by which a game is made to progress with display of an image timed to a reference signal supplied every unit cycle, said processing execution control program causing a computer to execute a process comprising:

executing real time processing accompanied by a display routine containing a dynamic element to be completed within a time of the unit cycle with input of a reference signal;

outputting a non real time processing request when a non real time processing accompanied by a thinking routine executable without being limited by the unit cycle is called by said real time processing;

switching a processing object to said non real time processing after said real time processing for the unit cycle has been completed;

executing said non real time processing; and when a subsequent reference signal is input after the processing object has been switched to said non real time processing, switching the processing object to said real time processing while interrupting said non real time processing; and resume in response in a subsequent unit cycle said non real time processing which has been interrupted.

5. The storage medium according to claim 4, wherein said procedures further comprising:

queuing said non real time processing request in order in a queue buffer; and executing said non real time process in order in said queue buffer.

6. The storage medium according to claim 5, wherein said process further comprises:

queuing a new non real time processing request in the queue buffer when said non real time processing calls a new non real time process.

7. A game apparatus for making a game progress with display of an image timed to a reference signal supplied every unit cycle, said game apparatus comprising:

a real time processing execution unit for executing real time processing accompanied by a display routine containing a dynamic element to be completed within a time of said unit cycle with input of said reference signal, and outputting a non real time processing request when a non real time processing accompanied by a sub routine executable without being limited by said unit cycle, is called by said real time processing;

a non real time processing execution unit for executing said non real time processing and assuring that the processing is completed even with interruption; and a processing switch controller for starting the non real time processing execution unit after said real time processing execution unit has been completed, and for starting said real time processing execution unit while interrupting said non real time processing execution unit, with input of said reference signal.

8. A computer data signal embodied in a transmission medium, said computer data signal containing a processing execution control program by which a game is made to progress with display of an image timed to reference signal supplied ever unit cycle, wherein said program causes a computer to perform a process comprising:

executing real time processing accompanied by a display routine containing a dynamic element to be completed within a time of the unit cycle with input of a reference signal;

outputting a non real time processing request when a non real time processing accompanied by a thinking routine executable without being limited by the unit cycle is called by said real time processing;

switching a processing object to said non real time processing after said real time processing for the unit cycle has been completed;

executing said non real time processing; and when a subsequent reference signal is input after the processing object has been switched to said non real time processing, switching the processing object to said real time processing while interrupting said non real time processing; and resume in response in a subsequent unit cycle said non real time processing which has been interrupted.

9. The computer data signal according to claim 8, wherein said computer data signal is a compressed data signal.

10. The computer data signal according to claim 8, wherein said computer data signal is an encrypted computer data signal.

11. A computer program products containing a processing execution control program by which a game is made to progress with display of an image timed to reference signal supplied ever unit cycle, said computer program products comprising:

computer code for executing real time processing accompanied by a display routine containing a dynamic element to be completed within a time of the unit cycle with input of a reference signal;

computer code for outputting a non real time processing request when a non real time processing accompanied by a thinking routine executable without being limited by the unit cycle is called by said real time processing;

computer code for switching a processing object to said non real time processing after said real time processing for the unit cycle has been completed;

computer code for executing said non real time processing; and computer code, when a subsequent reference signal is input after the processing object has been switched to said non real time processing, switching the processing object to said real time processing while interrupting said non real time processing; and computer code for resume in response in a subsequent unit cycle said non real time processing which has been interrupted.

* * * * *